Oct. 13, 1925.

G. H. BLINN

POULTRY ROOST

Filed Nov. 13, 1923

1,557,236

Witness
P. M. Hunt

Inventor
G. H. Blinn
By Clarence A. O'Brien
Attorney

Patented Oct. 13, 1925.

1,557,236

UNITED STATES PATENT OFFICE.

GEORGE H. BLINN, OF TOPSFIELD, MAINE.

POULTRY ROOST.

Application filed November 13, 1923. Serial No. 674,533.

*To all whom it may concern:*

Be it known that I, GEORGE H. BLINN, a subject of the King of Great Britain, residing at Topsfield, in the county of Washington and State of Maine, have invented certain new and useful Improvements in Poultry Roosts, of which the following is a specification.

This invention relates to a poultry or chicken roost, and more particularly to the class of chicken roost wherein provision is made for effective collection or trapping of insects or vermin, whereby the latter may be effectively destroyed in quantities when the roost is cleaned.

Another object of the invention is the provision of a chicken roost of this character in which the chickens or other fowls perched thereon will be protected from insects, lice or other vermin, the roost being readily and easily opened for cleaning purposes, whereby the same may be maintained in sanitary condition.

A still further object of the invention is the provision of a roost of this character which is simple in construction, thoroughly reliable and efficient in operation, and inexpensive in manufacture.

With these and other objects in view, the invention consists in the construction, combination, and arrangement of parts as will be more fully hereinafter described, illustrated in the accompanying drawing, and pointed out in the appended claim.

In the drawings, wherein like reference characters indicate corresponding parts throughout the several views.

Figure 1:
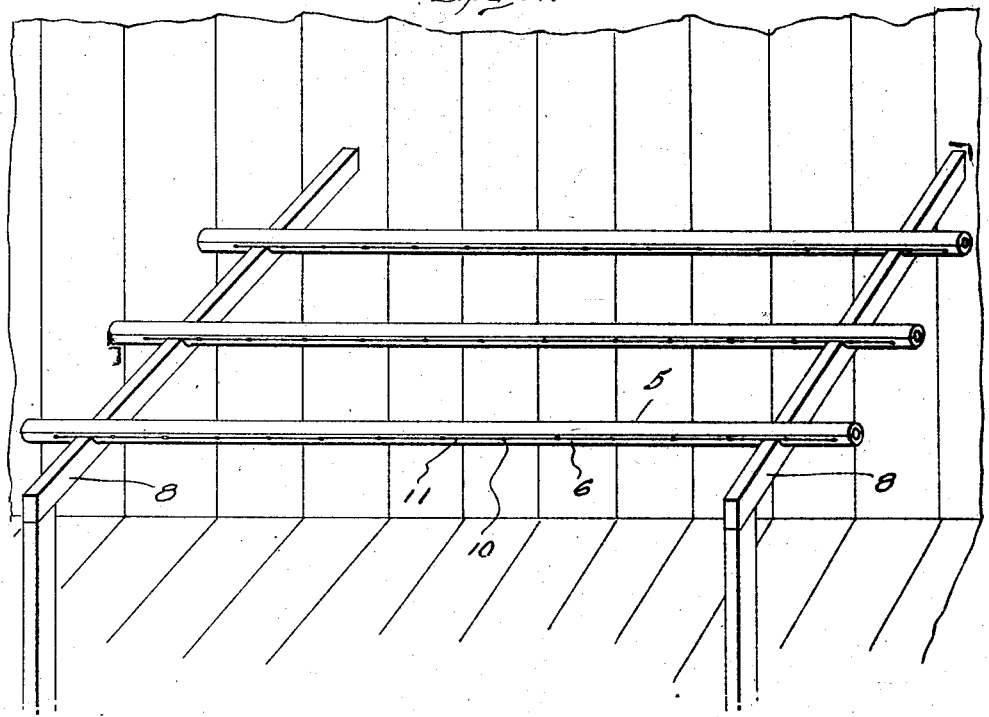
Figure 1 is a perspective view of a poultry roost employing perch bars constructed in accordance with the present invention.
Figure 2:
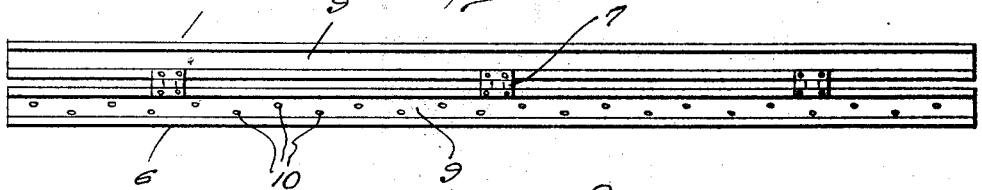
Figure 2 is an elevational view of one of the perch bars shown in Figure 1, in open position.

Referring more in detail to the drawing, the present invention has specific reference to an improved form of perch bar for use in constructing poultry roosts, and such perch bar comprises complementary sections 5 and 6, each being preferably constructed from wood although the same may be made from any other suitable material and both sections are suitably fastened or secured together by means of hinges 7, thereby enabling the upper section 5 to be swung upwardly to open position when the lower section 6 is supported at its ends in transverse grooves of spaced parallel supporting bars of an ordinary roost frame construction for cleaning purposes. The sections 5 and 6 are provided in their inner abutting faces with semi-circular shaped registering grooves or channels 9, whereby said sections cooperate to provide a hollow open ended structure.

Figure 3:
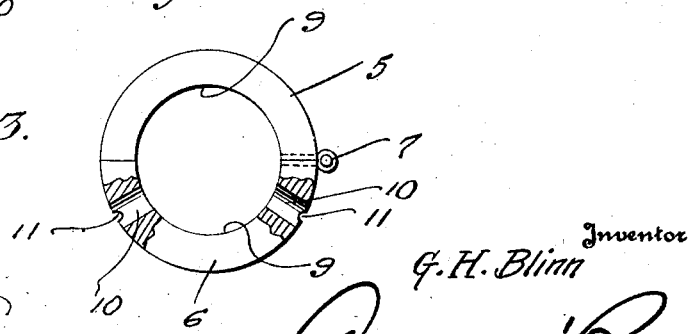
Figure 3 is a view partly in section and partly in end elevation of one of the perch bars in closed position, and drawn on a larger scale.

The upper section 5 is imperforate so as to prevent the entrance of dirt or other foreign matter into the perch bar, but the lower section 6 is provided with a plurality of longitudinal series of perforations as at 10, which are disposed in downwardly diverging relation as shown in Figure 3. The opening 10 of each series are preferably connected by longitudinal grooves 11 provided in the outer surface of the lower sections 6 so that the insects and vermin will be effectively lead to said openings 10 for encouraging their passage into the interior of the perch bar.

It is particularly noted that the present invention merely provides effective means for the trapping or collection of the insects or vermin and is thereby distinguished from vermin destroying perch bars, within which a vermin destroying composition or the like is placed.

The perch bar may be readily cleaned from time to time by simply swinging the upper section 5 upwardly to open position and then flushing the interior of the sections by means of hot water or the like, disposing a suitable receptacle beneath the perch bar for collecting the vermin washed therefrom, it being understood that these collected vermin may be destroyed by any suitable means at the most preferred time. By causing a flow of water longitudinally of the sections from one end to the other and leaving the hollow structure open at the ends thereof, the cleaning operation is rendered more easy and effective. By providing the openings 10 only in the bottom section 6 and in downwardly diverging relation, the interior of the perch bar is kept clean and provision for the entrance of the vermin into the bar is made most practical.

From the above description, it is believed that the construction and operation, as well as the advantages of the present invention will be readily understood and appreciated by those skilled in the art.

What I claim as new is:

A poultry perch comprising a hollow cylindrical open ended body composed of upper and lower semi-cylindrical parts, said parts being substantially channel-shaped in cross section and being hingedly connected together, the upper part of said body being imperforate and the lower part being provided with a multiplicity of longitudinally spaced openings communicating with the interior of said body, said openings being disposed in longitudinal rows extending from end to end of the lower part and being arranged in divergent relation on opposite sides of the longitudinal center of the latter to form two rows, there being a pair of longitudinal grooves formed in the outer surface of said lower part, and said grooves intersecting said openings, whereby to interconnect the same to guide and facilitate entrance of the insects.

In testimony whereof I affix my signature.

GEORGE H. BLINN.